(No Model.) 2 Sheets—Sheet 1.

H. GROSWITH.
ELECTRIC MOTOR.

No. 441,953. Patented Dec. 2, 1890.

WITNESSES: F. L. Ourand, Wm. F. Folks

INVENTOR: Henry Groswith, by Saml. Bagger & Co., Attorneys.

(No Model.) 2 Sheets—Sheet 2.

H. GROSWITH.
ELECTRIC MOTOR.

No. 441,953. Patented Dec. 2, 1890.

WITNESSES:
F. L. Ourand
Wm F. Folks

INVENTOR:
Henry Groswith
by James Dagger
Attorney

United States Patent Office.

HENRY GROSWITH, OF PHILADELPHIA, PENNSYLVANIA, ASSIGNOR, BY DIRECT AND MESNE ASSIGNMENTS, TO THE KENNEDY-GROSWITH ELECTRIC COMPANY, OF SAME PLACE.

ELECTRIC MOTOR.

SPECIFICATION forming part of Letters Patent No. 441,953, dated December 2, 1890.

Application filed August 13, 1889. Serial No. 320,617. (No model.)

*To all whom it may concern:*

Be it known that I, HENRY GROSWITH, a citizen of the United States, and a resident of Philadelphia, in the county of Philadelphia and State of Pennsylvania, have invented certain new and useful Improvements in Electric Motors; and I do hereby declare that the following is a full, clear, and exact description of the invention, which will enable others skilled in the art to which it appertains to make and use the same, reference being had to the accompanying drawings, which form a part of this specification.

My invention relates to improvements in reversing mechanism for electric motors, whereby the direction of rotation of the armature may be changed when desired.

The invention consists in the novel construction and combination of parts hereinafter fully described, and specifically defined in the claim.

Figure 1:
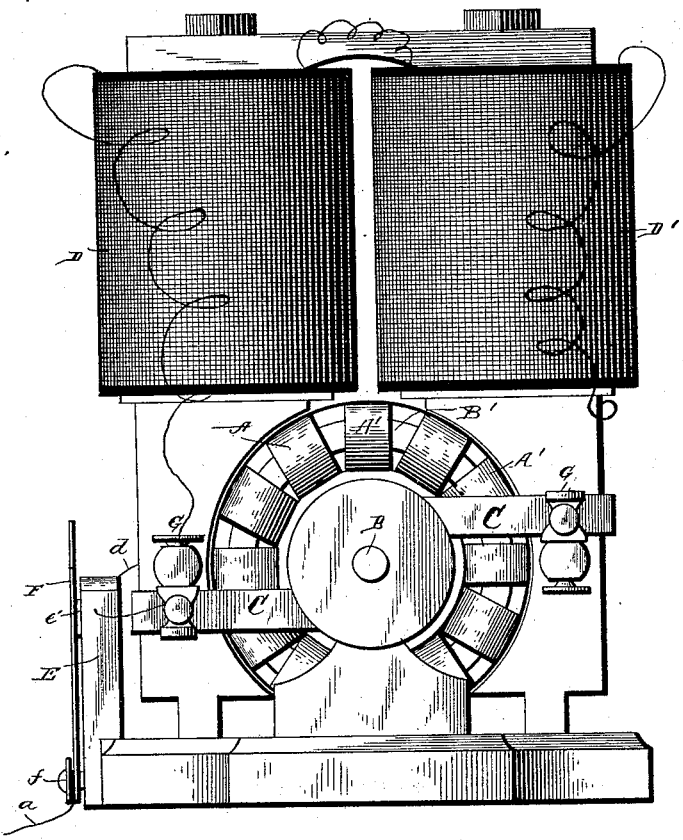
Figure 2:
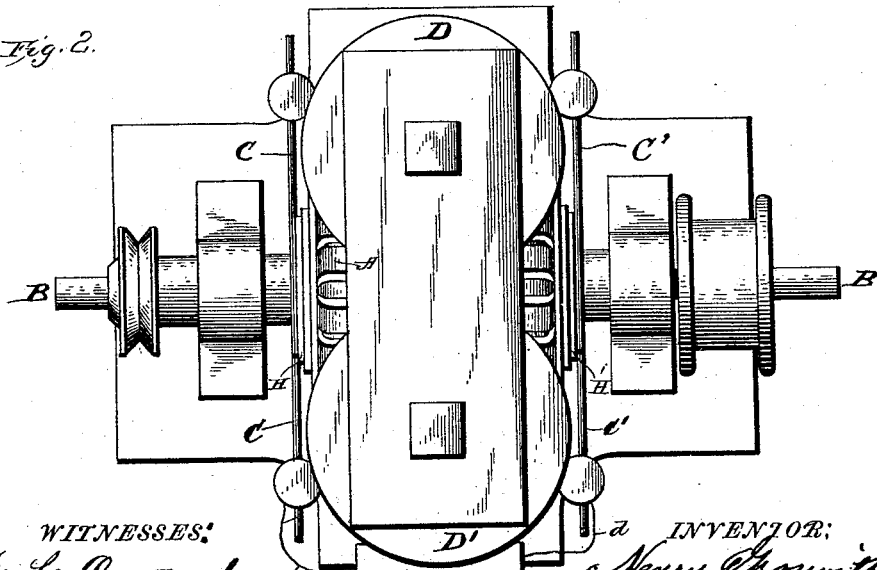
Figure 3:
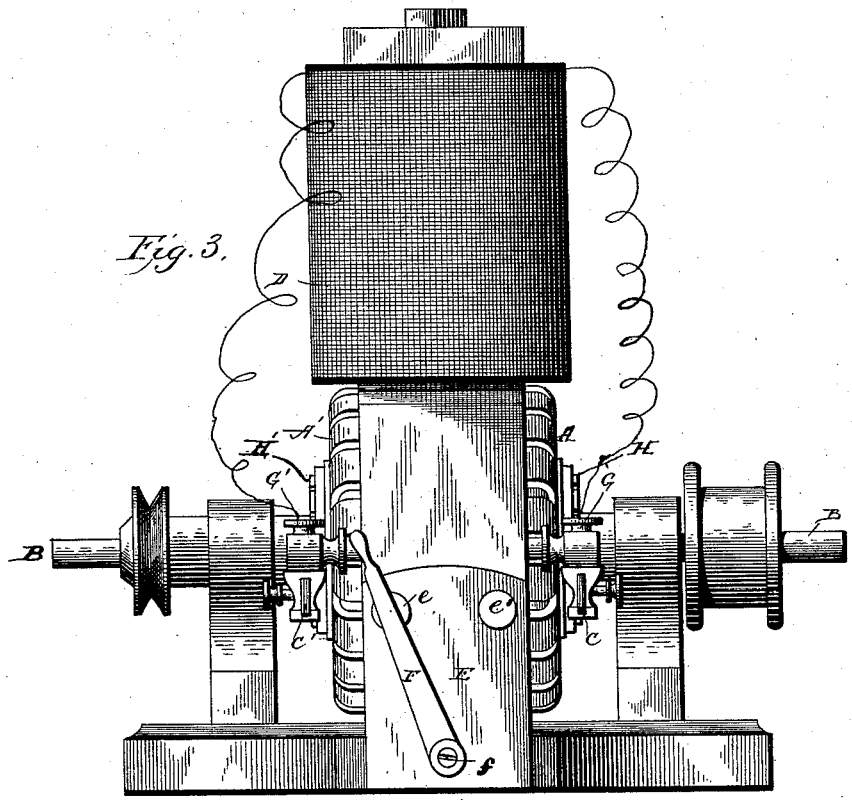
Figure 4:
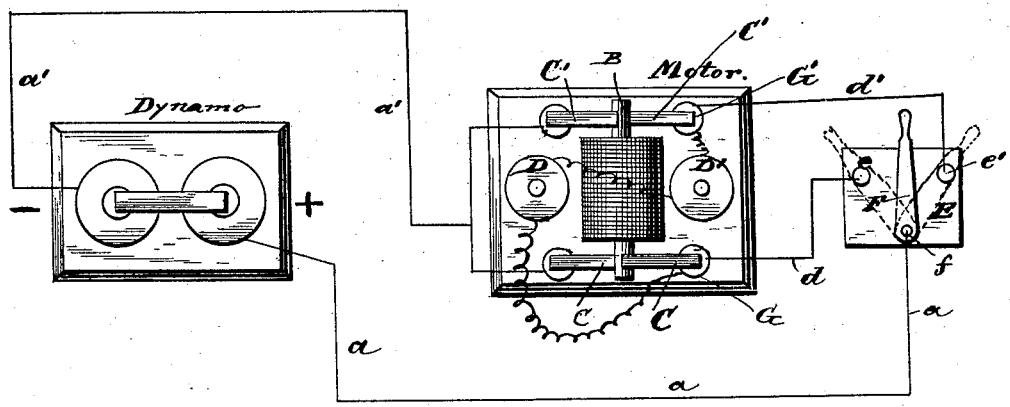

In the accompanying drawings, Figure 1 is a side elevation of an electric motor constructed in accordance with my invention. Fig. 2 is a plan view. Fig. 3 is an end view, and Fig 4 is a diagram of the circuits.

In the said drawings the armature is of a well-known type, consisting of two sets of separate coils A and A', alternately connected to a pair of separate commutators H H'. The commutators are provided with the usual brushes C C and C' C', and connection is made as follows: The positive brushes of the respective commutators are connected with the two contacts $e\ e'$ of the switch F, which is connected with the positive-circuit terminal at $f$.

D D' designate the field-magnets, which may be of any ordinary construction, but are preferably made in accordance with the invention described and claimed in Letters Patent granted to me on May 20, 1890, No. 428,481.

The terminals of the field-magnet wires are connected to the contacts $e$ and $e'$ by means of the wires $d\ d'$, as also are the positive brushes of each commutator, as before stated, while the negative brushes of the commutators are connected to the negative terminal $a'$ leading to generator.

G G' designate ordinary binding-posts.

The circuit will be as follows, supposing switch F to be shifted to contact $e$: from conductor $d$ to binding-post G, to brush C through coils A, and thence through other brush C to negative terminal $a'$, to generator. At the same time circuit will also be from binding-post G to field-magnet D, then to field-magnet D', to binding-post G', through brushes C' and coils A' to dynamo through conductor $a'$. A shifting of the lever to plate $e'$ will cause a reversal of the circuit, which will then be from $d'$ through G', C, A', and $a'$ to dynamo, and from G' to D', D, C, C, A, and $a'$ to dynamo or generator. When the lever F is in the position in which it is shown in full lines, Fig. 4, the circuit is broken and the motor stopped.

From the above it will be seen that the two armature-coils are entirely distinct and separate from each other, and are so wound electrically that the currents will be in the same direction in each.

Having thus described my invention, what I claim is—

The combination, with the field-magnets and armature of an electric motor, said armature having separate coils connected, respectively, to commutators having positive and negative brushes on opposite sides of the machine, of a reversing-lever, a conductor connecting said lever with the positive pole of a source of electricity, the contacts $e$ and $e'$, electrically connected, respectively, with each of the positive brushes of the commutators, the field-magnets having their terminal wires connected with said positive brushes, and the return-conductor connected with the negative brushes of the commutators and with the negative pole of the source of electricity, substantially as described.

In testimony that I claim the foregoing as my own I have hereunto affixed my signature in presence of two witnesses.

HENRY GROSWITH.

Witnesses:
R. F. RANKIN,
ROY MEZGER.